(12) United States Patent
Hashimoto

(10) Patent No.: US 12,470,604 B2
(45) Date of Patent: Nov. 11, 2025

(54) COMMUNICATION REQUIREMENT GENERATION SYSTEM AND COMMUNICATION REQUIREMENT GENERATION METHOD

(71) Applicant: Hitachi, Ltd., Tokyo (JP)

(72) Inventor: Yoshiki Hashimoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 167 days.

(21) Appl. No.: 18/463,616

(22) Filed: Sep. 8, 2023

(65) Prior Publication Data
US 2024/0348665 A1  Oct. 17, 2024

(30) Foreign Application Priority Data

Apr. 12, 2023 (JP) ................................ 2023-065024

(51) Int. Cl.
*H04L 9/40* (2022.01)
*H04L 29/06* (2006.01)
*H04W 28/18* (2009.01)

(52) U.S. Cl.
CPC ........... *H04L 63/205* (2013.01); *H04W 28/18* (2013.01)

(58) Field of Classification Search
CPC ...... H04W 28/18; H04L 63/205; H04L 63/10; H04L 63/102; H04L 63/105; H04L 63/107; H04L 63/20; H04L 63/1433; H04L 63/16
See application file for complete search history.

(56) References Cited

U.S. PATENT DOCUMENTS

2011/0317710 A1* 12/2011 Tessier .................... H04L 45/02
370/401
2018/0048666 A1*  2/2018 Alderson ................ H04L 63/10

FOREIGN PATENT DOCUMENTS

JP         2021-111905 A1    8/2021
JP            7136719 B2     9/2022

OTHER PUBLICATIONS

English translation of Japanese Office Action issued in corresponding JP Application No. 2023-065024, dated Jun. 11, 2024 (2 pages).

* cited by examiner

*Primary Examiner* — Edward Zee
(74) *Attorney, Agent, or Firm* — Foley & Lardner LLP

(57) ABSTRACT

Provided is a communication requirement generation system capable of easily generating a communication requirement. The communication requirement generation system includes a storage unit that stores definition information for calculating a logical distance between components that perform communication in a predetermined network, a determining unit that calculate, for each of a plurality of communication requirements related to the component connected to the network, a logical distance between the component and a component which is a communication partner of the component based on the definition information stored in the storage unit, and determines, based on the calculated distance, whether each of the communication requirements is a communication requirement that requires confirmation of an operator of the network, and an output unit that outputs the communication requirement determined by the determining unit when the communication requirement is the communication requirement that requires confirmation of the operator of the network.

8 Claims, 13 Drawing Sheets

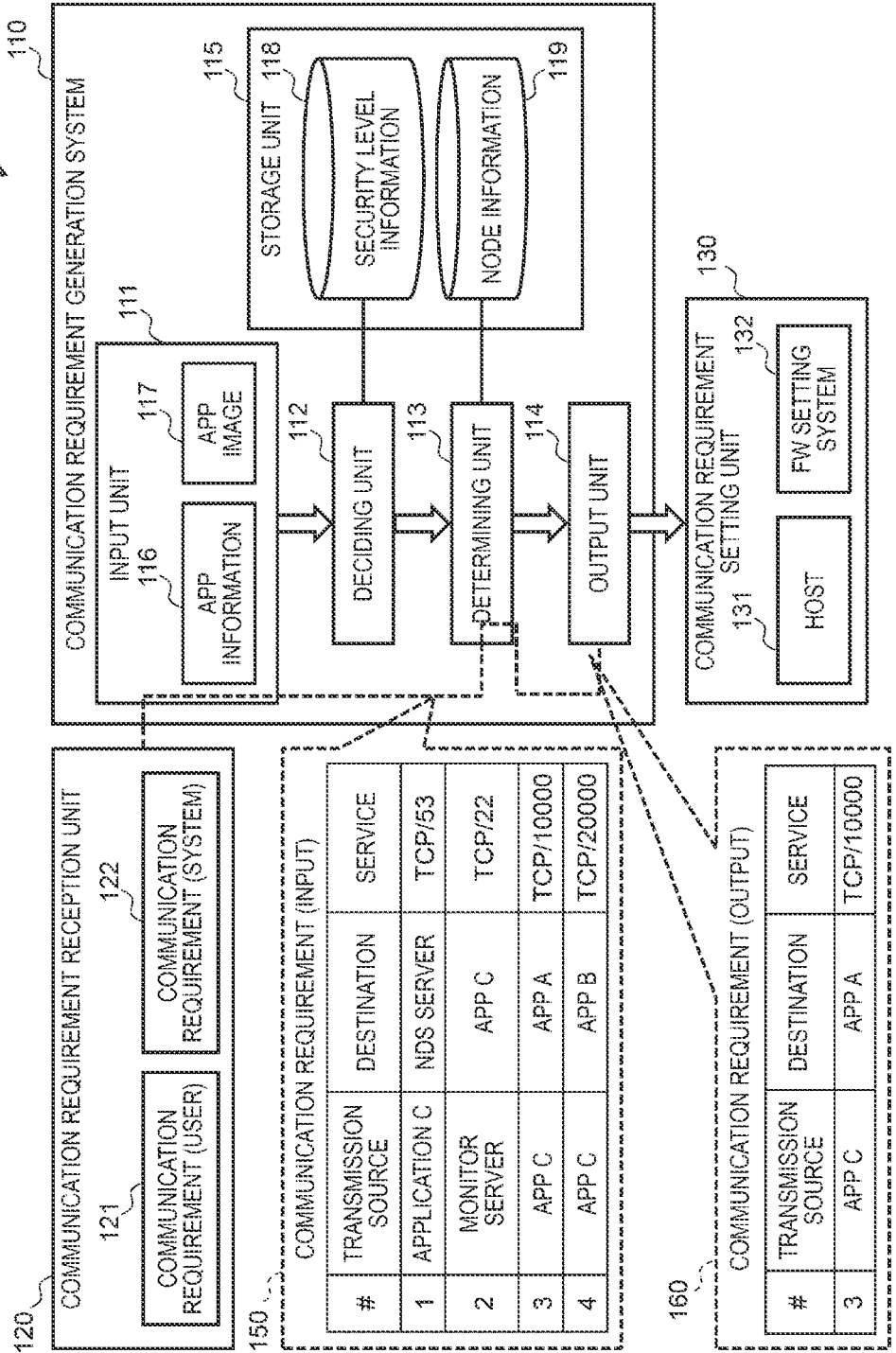

[FIG. 2]
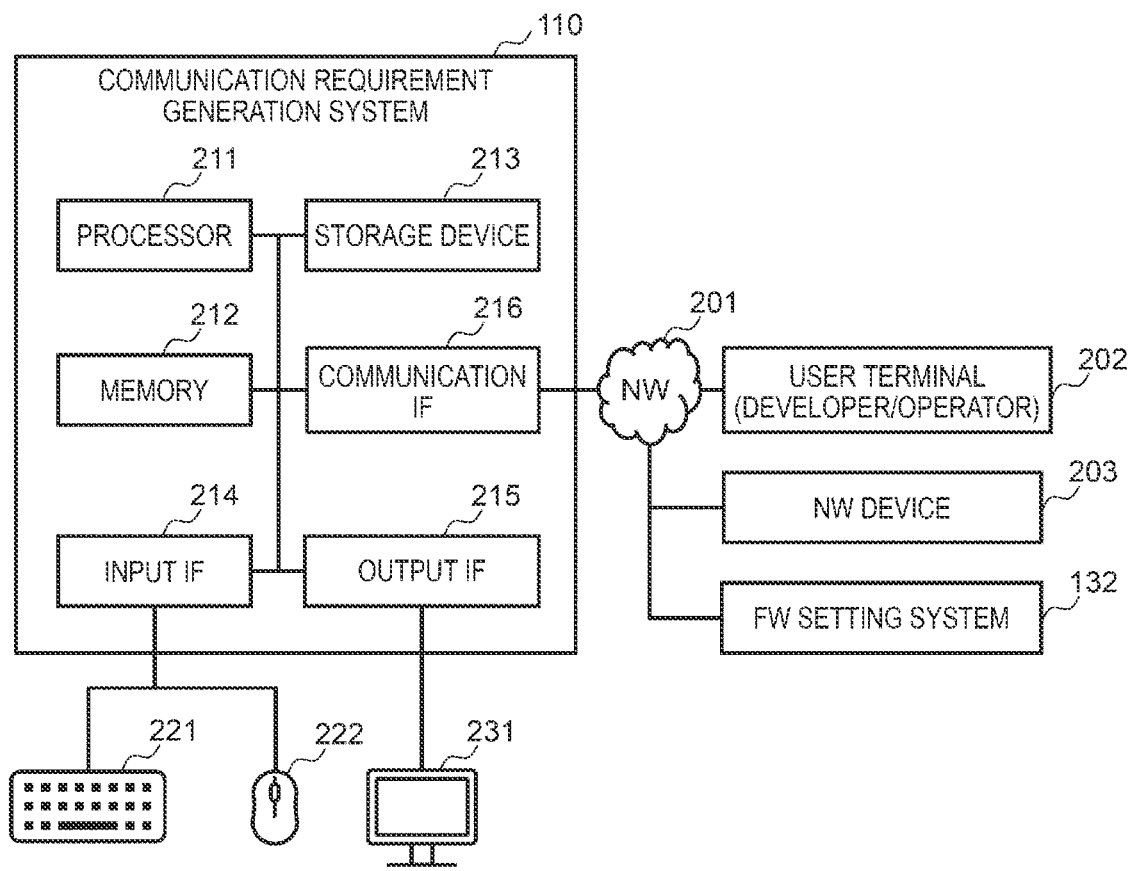

[FIG. 3]

| # | OUTLINE | USER INPUT CONTENTS | SECURITY LEVEL APPLICATION EXAMPLE |
|---|---|---|---|
| 1 | BUSINESS TYPE | SELECT ONE FROM PUBLIC, FINANCE, EDUCATION, AND THE LIKE | FINANCE: HIGH SECURITY LEVEL EDUCATION: LOW SECURITY LEVEL |
| 2 | APP TYPE | SELECT ONE FROM APP, WEB, DB AND THE LIKE | DB: HIGH SECURITY LEVEL |
| 3 | HANDLED DATA | SELECT HANDLED DATA ☐PERSONAL INFORMATION ☐CONFIDENTIAL INFORMATION | SECURITY LEVEL IS HIGH IN CASE OF PERSONAL INFORMATION OR CONFIDENTIAL INFORMATION |
| 4 | INTERNET COMMUNICATION | SELECT WHETHER THERE IS INTERNET COMMUNICATION | SECURITY LEVEL IS HIGH WHEN THERE IS INTERNET COMMUNICATION |
| 5 | .. | | |

[FIG. 4]

| # | SECURITY LEVEL | OUTLINE | CONDITION | APP SECURITY COST | COMMUNICATION PERMISSION SECURITY COST |
|---|---|---|---|---|---|
| 1 | HIGH | APP THAT IS OPEN TO THE PUBLIC, AND IN WHICH ACCESS CONTROL IS STRICTLY PERFORMED SINCE CONFIDENTIAL INFORMATION OR PERSONAL INFORMATION IS INCLUDED | WITH INTERNET CONNECTION AND INCLUDE CONFIDENTIAL INFORMATION OR PERSONAL INFORMATION | 10 | 2 |
| 2 | MEDIUM | APP THAT IS OPEN TO THE PUBLIC AND IN WHICH MEDIUM LEVEL ACCESS CONTROL IS PERFORMED | WITH INTERNET CONNECTION AND APPLY TO ANY OF THE FOLLOWING: BUSINESS TYPE: FINANCE NUMBER OF REQUESTS: ○○ OR MORE | 2 | 5 |
| 3 | LOW | APP THAT IS NOT FREQUENTLY USED, IS ONLY USED IN COMPANY, AND THE LIKE, AND IN WHICH LOOSE ACCESS CONTROL MAY BE PERFORMED | APP THAT DOES NOT APPLY TO ITEM 1 AND ITEM 2 | 1 | 10 |

[FIG. 5]

| # | NODE | PARENT NODE | SECURITY COST |
|---|---|---|---|
| 1 | INTERNET | - | 10 |
| 2 | ENTIRE NETWORK OF COMPANY X | INTERNET | 5 |
| 3 | GENERAL SERVICE | INTERNET | 5 |
| 4 | DNS/MONITOR SERVER, AND THE LIKE | ENTIRE NETWORK OF COMPANY X (IN COMPANY X) | 1 |
| 5 | Y AREA (Y DEPARTMENT, AND THE LIKE) | ENTIRE NETWORK OF COMPANY X (IN COMPANY X) | 2 |
| ... | ... | ... | ... |
| 26 | USER A | Y AREA (Y DEPARTMENT, AND THE LIKE) | 1 |
| 27 | Z SYSTEM | Y AREA (Y DEPARTMENT, AND THE LIKE) | 1 |
| 28 | APP A | Z SYSTEM | 10 |
| 29 | APP B | Z SYSTEM | 2 |
| 30 | APP C | Z SYSTEM | 1 |
| ... | ... | ... | ... |

[FIG. 6]

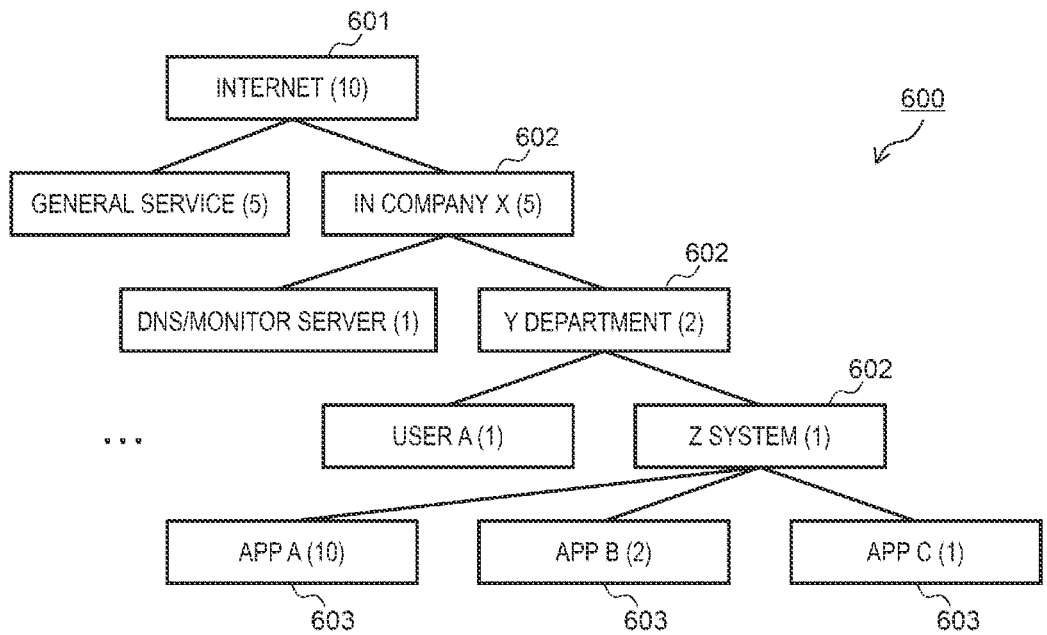

[FIG. 7]
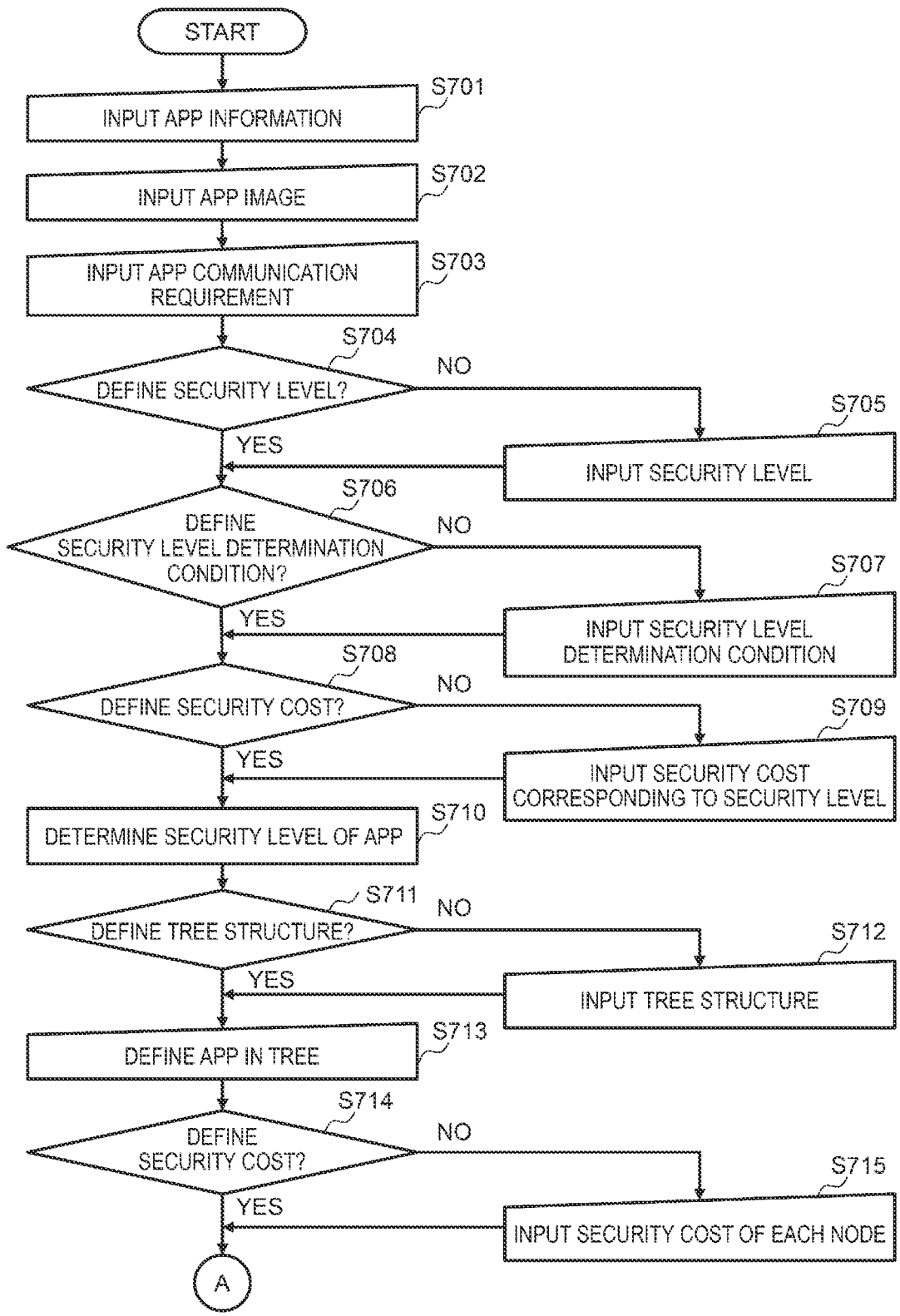

[FIG. 8]
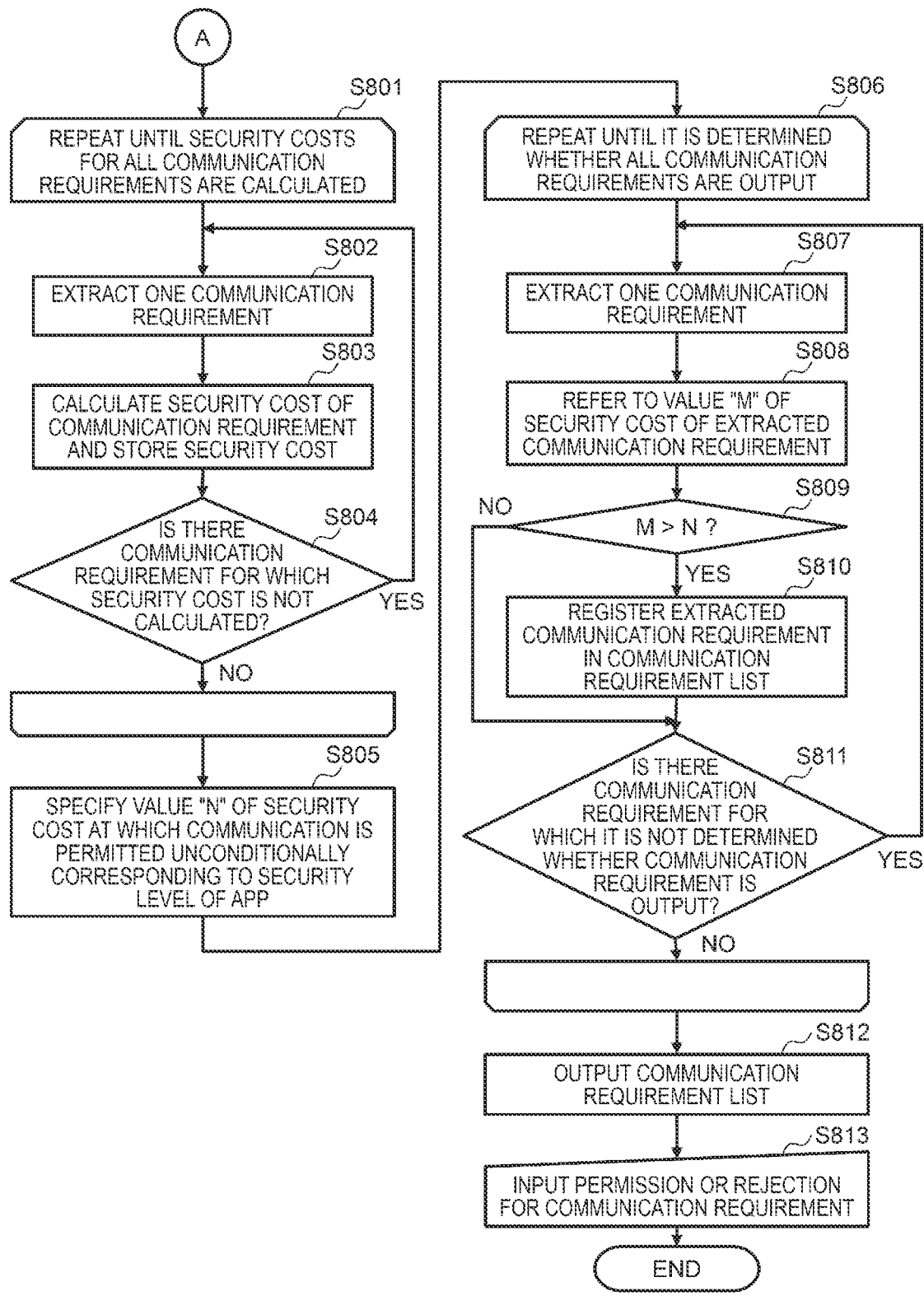

[FIG. 9]

INPUT SCREEN (APP) — 900

910:
- BUSINESS TYPE
  ■ FINANCE □ PUBLIC □ EDUCATION □ ENVIRONMENT · · ·

- INTERNET CONNECTION
  ■ YES □ NO

- APP TYPE
  ■ WebAPP
  □ DATABASE
  □ MOBILE APP
  . . .

- CONFIDENTIAL INFORMATION
  □ YES ■ NO

920:
- APP IMAGE
  ■ YES
    FILE NAME: XXX.zip
  □ NO

INPUT SCREEN (COMMUNICATION REQUIREMENT) — 1000

1010:
- INPUT METHOD OF COMMUNICATION REQUIREMENT
  ■ MANUAL INPUT

| # (1011) | TRANSMISSION SOURCE (1012) | DESTINATION (1013) | SERVICE (1014) |
|---|---|---|---|
| 1 | APP C | DNS SERVER | TCP/53 |
| 2 | MONITOR SERVER | APP C | TCP/22 |
| 3 | APP C | APP A | TCP/10000 |
| 4 | APP C | APP B | TCP/20000 |

1020:
□ FILE UPLOAD
  FILE NAME: YYY.csv

[FIG. 11]
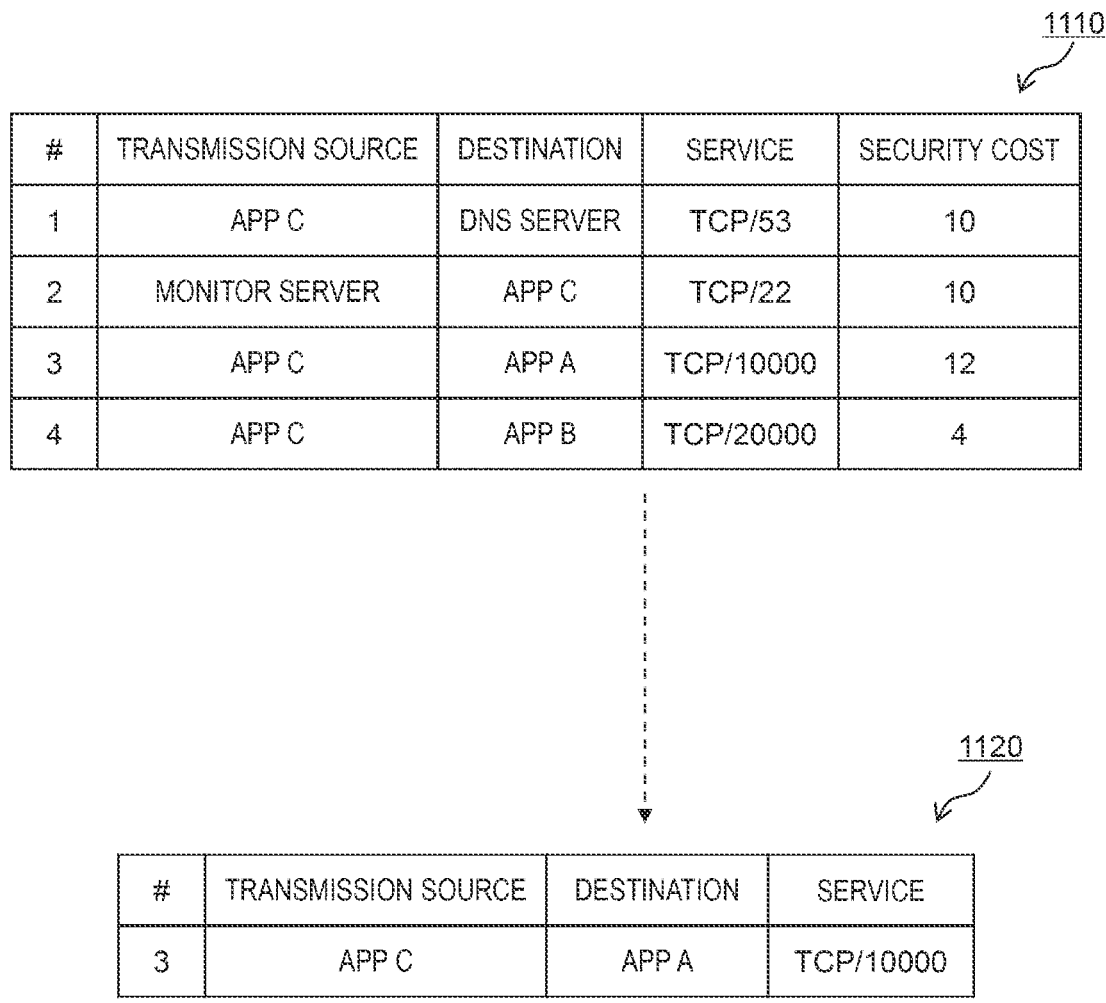

[FIG. 12]
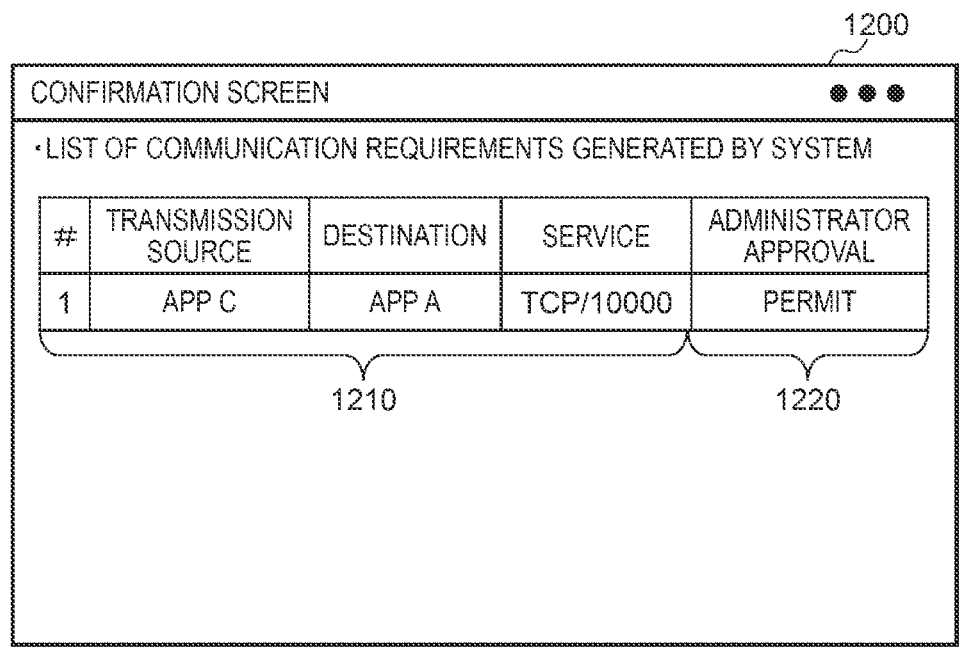

| # | TRANSMISSION SOURCE | DESTINATION | SERVICE | ACTION |
|---|---|---|---|---|
| 1 | APP C | DNS SERVER | TCP/53 | PERMIT |
| 2 | MONITOR SERVER | APP C | TCP/22 | PERMIT |
| 3 | APP C | APP A | TCP/10000 | PERMIT |
| 4 | APP C | APP B | TCP/20000 | PERMIT |
| 5 | ANY | ANY | ANY | REJECT |

1301  1302  1303  1304  1305

[FIG. 14]
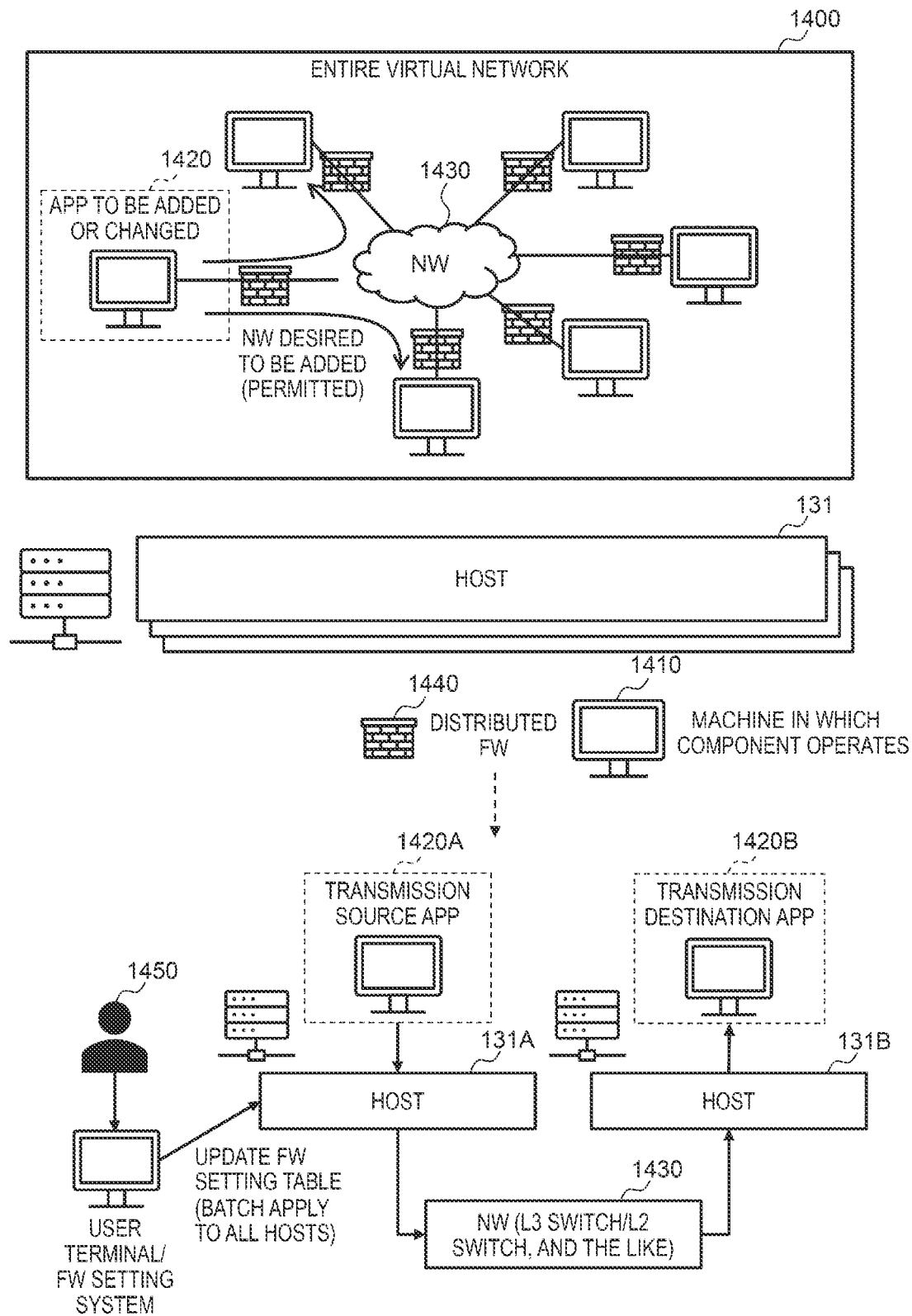

[FIG. 15]
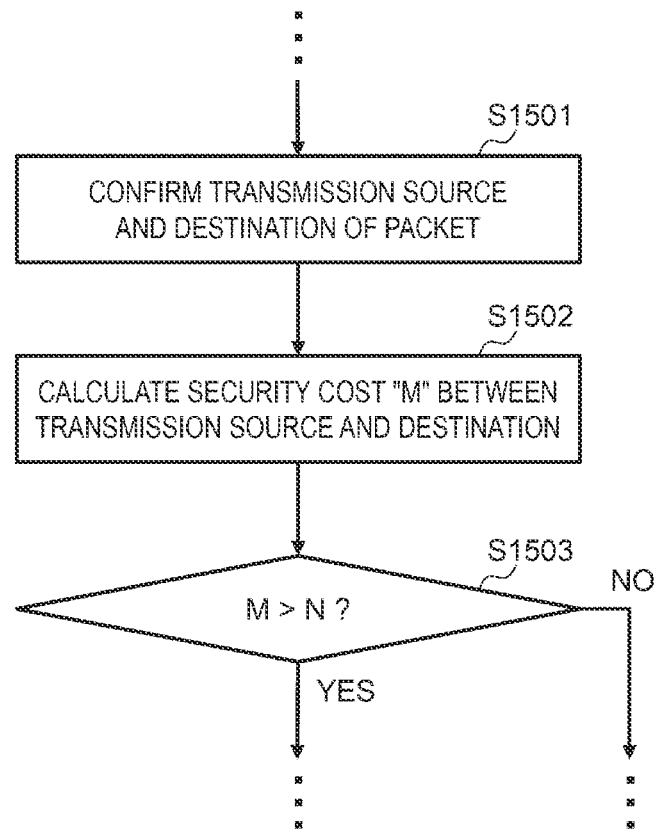

[FIG. 16]
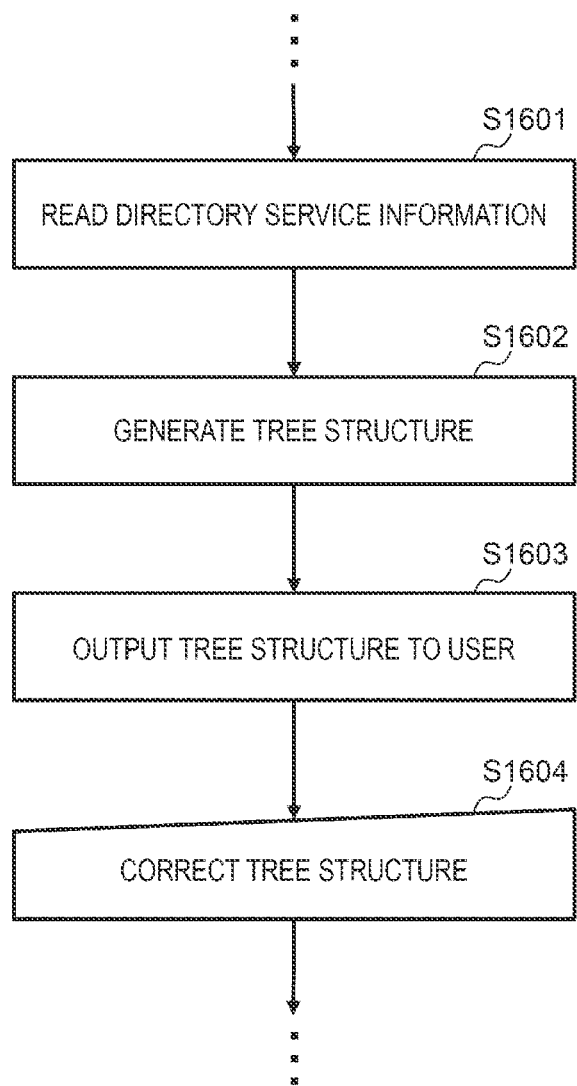

COMMUNICATION REQUIREMENT GENERATION SYSTEM AND COMMUNICATION REQUIREMENT GENERATION METHOD

TECHNICAL FIELD

The present invention generally relates to a technique for generating a communication requirement.

BACKGROUND ART

In recent years, a situation in which there is a target to be protected on the Internet increases with the spread of a cloud service. In the related art, a network (NW) is defined on a reliable inner side and an unreliable outer side, and access control is performed by a boundary firewall (FW). However, since targets to be protected are scattered in various places, a boundary between the inner side and the outer side is ambiguous, and it is difficult to take a sufficient measure in the access control in the related art. Recently, zero trust is spread, in which the access control is performed by a distributed FW or the like for internal NW communication, rather than unconditionally trusting an internal NW.

A company is required to, for example, add or correct an application program (APP) more quickly due to a rapid change of a business situation. In the related art, APPs are designed as one big chunk in which all functions are integrated. However, a development method in the related art cannot quickly respond to a request. In this regard, attention has been paid to a micro service capable of efficiently developing a huge and complicated APP for each function (component). In the micro service, an individual component has a low dependency relationship, and each service is called via an NW.

In this manner, the number of components connected to the NW is increased with the spread of the zero trust and the micro service, and a case where a distributed FW is introduced for each component is increased, a load of an NW operator who sets communication requirements indicating communication among components in the distributed FW is increased.

In this regard, a network requirement generation system that automatically generates communication requirements is disclosed (see PTL 1).

CITATION LIST

Patent Literature

PTL 1: JP7136719B

SUMMARY OF INVENTION

Technical Problem

According to the network requirement generation system disclosed in PTL 1, since communication requirements are automatically generated, a load of generating the communication requirements is reduced. However, there is a problem that the NW operator needs to confirm whether to permit communication for all of the generated communication requirements.

The present invention has been made in view of the above points, and proposes a communication requirement generation system and the like capable of easily generating communication requirements.

Solution to Problem

In order to solve the above problems, the present invention provides a communication requirement generation system that includes a storage unit configured to store definition information for calculating a logical distance between components that perform communication in a predetermined network, a determining unit configured to calculate, for each of a plurality of communication requirements related to a component connected to the network, a logical distance between the component and a component which is a communication partner of the component based on the definition information stored in the storage unit, and determine, based on the calculated distance, whether each of the communication requirements is a communication requirement that requires confirmation of an operator of the network, and an output unit configured to output the communication requirement determined by the determining unit when the communication requirement is the communication requirement that requires confirmation of the operator of the network.

In the above configuration, it is determined whether each of the communication requirements is the communication requirement that requires confirmation of the operator of the network according to a logical positional relationship between the component connected to the network and the component of a communication partner. According to the above configuration, it is possible to reduce a load of the operator of the network for setting a communication requirement to a firewall by, for example, focusing on communication requirements that require confirmation of the operator of the network from the plurality of communication requirements related to the component connected to the network.

Advantageous Effects of Invention

According to the present invention, it is possible to improve convenience of the communication requirement generation system. Problems, configurations, and effects other than those described above will become apparent based on following description of embodiments.

BRIEF DESCRIPTION OF DRAWINGS

FIG. 1 is a diagram illustrating an example of a configuration of a communication management system according to a first embodiment.

FIG. 2 is a diagram illustrating an example of a hardware configuration of a communication requirement generation system according to the first embodiment.

FIG. 3 is a diagram illustrating an example of template information according to the first embodiment.

FIG. 4 is a diagram illustrating an example of security level information according to the first embodiment.

FIG. 5 is a diagram illustrating an example of node information according to the first embodiment.

FIG. 6 is a diagram showing an example of a tree structure according to the first embodiment.

FIG. 7 is a diagram illustrating an example of communication requirement generation processing according to the first embodiment.

FIG. 8 is a diagram illustrating an example of the communication requirement generation processing according to the first embodiment.

FIG. 9 is a diagram illustrating an example of an input screen according to the first embodiment.

FIG. 10 is a diagram illustrating an example of the input screen according to the first embodiment.

FIG. 11 is a diagram illustrating an example of a security cost list according to the first embodiment.

FIG. 12 is a diagram illustrating an example of a confirmation screen according to the first embodiment.

FIG. 13 is a diagram illustrating an example of FW setting information according to the first embodiment.

FIG. 14 is a diagram illustrating an example of communication management according to the first embodiment.

FIG. 15 is a diagram illustrating an example of packet control processing according to a second embodiment.

FIG. 16 is a diagram showing an example of tree structure generation processing according to a third embodiment.

DESCRIPTION OF EMBODIMENTS (I) First Embodiment

Hereinafter, embodiments of the present invention will be described in detail. The present invention is not limited to the embodiments.

A communication requirement generation system according to the present embodiment determines a security level of a component based on information of the component. The communication requirement generation system specifies a logical distance between a component connected to an NW and a component which is a communication partner of the component based on a tree structure in which a logical distance between components is defined, identifies a communication requirement (for example, a communication requirement having a high security risk) that requires confirmation of an NW operator from a plurality of communication requirements based on at least one of the determined security level and the specified logical distance, and outputs the communication requirement.

A component is software or hardware communicably connected to the NW, and is an APP, an APP function, a predetermined terminal, or the like. Information of a component includes at least one of a business type, a component type, a type of data handled by the component (personal information, confidential information, and the like), and presence or absence of Internet communication, a component behavior (for example, a usage state of a resource used by the component), and the like.

A logical distance between components is a value calculated by considering the number of nodes between the components and a security cost of each node, instead of a physical distance between the components (the number of switches, routers, or the like). A node is a element when a logical structure of components in a company is expressed in a tree structure, and is a company, a department, a system, or the like. A security cost is a value for evaluating a security risk, and is, for example, a numerical value defined corresponding to a security level and a numerical value added when communication among components is performed via each node. A security level is a degree of security strength of each node, which is determined according to characteristics of each node.

According to the above configuration, for example, since the logical distance between the component connected to the NW and the component of a communication partner and the identified communication requirement are output, an NW operator can easily select whether to permit communication of a communication requirement having a high security risk, and a load of setting a distributed FW by the NW operator can be reduced.

When a security level of a component connected to an NW is set more freely by a developer of the component, setting of a distributed FW is not suitable for a security policy of a company.

In this regard, the communication requirement generation system determines a security level of a communication requirement based on component information input by a developer of the component. The communication requirement generation system identifies, based on a security level and a logical distance, a communication requirement that requires confirmation of an NW operator. According to the above configuration, it is possible to avoid a situation in which setting of a distributed FW is not suitable for a security policy of a company since a security level of a component connected to an NW is automatically set.

Even when a security level of the component connected to the NW is determined, there is a problem in that the security level needs to be reflected in a communication requirement and contents to be set in a distributed FW needs to be determined.

In this regard, the communication requirement generation system calculates a security cost between the component connected to the NW and a communication partner of the component in consideration of the security level of the component, and determines whether a communication requirement is a communication requirement that requires confirmation of the NW operator. According to the above configuration, since the security cost between the component and the communication partner that is calculated based on the security level of the component is taken into consideration and a communication requirement that requires confirmation of the NW operator is determined, the NW operator can easily confirm a communication requirement in which a security level is reflected.

Expressions such as "first", "second", and "third" in the present specification and the like are made to identify components, and the numbers and orders are not necessarily limited. The number for identifying a component is used for each context, and the number used in one context does not necessarily indicate the same configuration in another context. It does not prevent a component identified by a certain number from having a function of a component identified by another number.

Next, embodiments of the present invention will be described with reference to drawings. The following description and drawings are examples illustrating the present invention, and are omitted and simplified as appropriate for clarification of the description. For example, a component is denoted by APP, a distributed FW is denoted by FW, and a virtual NW is denoted by NW. The present invention can be implemented in various other forms. Unless otherwise specified, each component may be a singular form or a plural form. In the following description, the same elements in the drawings are denoted by the same reference numerals, and description thereof will be appropriately omitted.

FIG. 1 is a diagram illustrating an example of a configuration of a communication management system 100 according to the present embodiment.

The communication management system 100 is a system for managing communication performed by an APP connected to a predetermined NW, and includes a communication requirement generation system 110, a communication requirement reception unit 120, and a communication requirement setting unit 130.

The communication requirement generation system 110 is a physical machine, a virtual machine, a cloud system, and the like, and includes an input unit 111, a deciding unit 112, a determining unit 113, an output unit 114, and a storage unit 115. A hardware configuration of the communication requirement generation system 110 will be described in detail with reference to FIG. 2.

The input unit 111 inputs various kinds of information instructed by an APP developer and inputs various kinds of information instructed by the NW operator. For example, the input unit 111 inputs APP information 116 that is information on a security level of an APP, a virtual machine file, an APP image 117 that is a container image, and the like. Template information on the input of the APP information 116 will be described in detail with reference to FIG. 3.

The deciding unit 112 uses security level information 118 to decide a security level of an APP based on at least one of the APP information 116 and information indicating an APP behavior. Hereinafter, a mode of deciding a security level of an APP using the APP information 116 will be mainly described.

Here, the information indicating an APP behavior is a traffic amount of a packet received or transmitted by the APP, the number of transmission control protocol (TCP) connections, a resource amount of resources (CPUs, memories, disks, and the like) used by the APP, and the like. The resource amount may be a predicted value when a component is newly added, or may be an actual measurement value when a component is moved. In other words, the deciding unit 112 may determine that an APP is an important APP as the resource amount increases and set a security level of the APP to be high. The security level information 118 will be described in detail with reference to FIG. 4.

The determining unit 113 uses node information 119 and the like to convert a communication requirement 150 (an input) received by the communication requirement reception unit 120 into a communication requirement 160 (an output) that requires confirmation of the NW operator. For example, the determining unit 113 compares a security cost of each communication requirement with a communication cost that is unconditionally permitted, deletes a communication requirement that is determined as a communication requirement having a low security cost under an assumption that the communication requirement is unconditionally permitted in advance, and sets a communication requirement determined as a communication requirement having a high security cost as the communication requirement 160. The node information 119 will be described in detail with reference to FIGS. 5 and 6.

Here, as illustrated in the communication requirement 150 and the communication requirement 160, a communication requirement includes information of an item number (#), a transmission source, a destination, and a service. The information of an item number is identification information for identifying a communication requirement. The information of a transmission source is information indicating a transmission source of communication (a name, an IP address, and the like). The information of a destination is information indicating a transmission destination (a destination) of communication (a name, an IP address, and the like). The information of a service is information for identifying a service used in communication (for example, an L4 protocol (TCP/UDP) which is a protocol of a fourth layer of an OSI reference model and a port number).

The output unit 114 outputs information of the communication requirement 160 converted by the determining unit 113. The NW operator performs a final determination (for example, an input indicating whether to permit communication of the communication requirement) for the communication requirement 160 based on the output information of the communication requirement 160. The output unit 114 outputs, to the communication requirement setting unit 130, the communication requirement for which the final determination is made by the NW operator.

The communication requirement reception unit 120 receives at least one of a communication requirement 121 (a user) generated by a user and a communication requirement 122 (a system) generated by a predetermined system. The communication requirement reception unit 120 transmits the received communication requirement 121 and/or communication requirement 122 as the communication requirement 150 to the communication requirement generation system 110.

The communication requirement setting unit 130 includes a host 131 and an FW setting system 132. The host 131 is software and/or hardware that implements a predetermined NW (for example, a virtual NW) and a predetermined FW (for example, a distributed FW). The host 131 may be a cloud service, a hypervisor, a runtime, or the like. The FW setting system 132 sets a communication requirement output from the communication requirement generation system 110 in FW setting information which will be described later and is referred to when the host 131 controls communication.

FIG. 2 is a diagram illustrating an example of a hardware configuration of the communication requirement generation system 110.

The communication requirement generation system 110 is communicably connected with a user terminal 202, an NW device 203, an FW setting system 132, and the like via an NW 201. The user terminal 202 is a terminal operated by an APP developer, an NW operator, or the like. The NW device 203 is a device that provides a predetermined NW, the host 131, and the like. The NW device 203 may be a device constituting the NW 201.

The communication requirement generation system 110 includes a processor 211, a memory 212, a storage device 213, an input IF 214, an output IF 215, and a communication IF 216.

The processor 211 is a device that performs arithmetic processing. The processor 211 is, for example, a central processing unit (CPU), a micro processing unit (MPU), a graphics processing unit (GPU), or an artificial intelligence (AI) chip.

The memory 212 is a device that stores a program, data, or the like. The memory 212 is, for example, a read only memory (ROM), a random access memory (RAM), or the like. The ROM is a static random access memory (SRAM), a nonvolatile RAM (NVRAM), a mask read only memory (ROM), a programmable ROM (PROM), or the like. The RAM is a dynamic random access memory (DRAM) or the like.

The storage device 213 is a hard disk drive, a flash memory, a solid state drive (SSD), an optical storage device, or the like. The optical storage device is a compact disc (CD), a digital versatile disc (DVD), or the like. A program, data, and the like stored in the storage device 213 are read into the memory 212 as needed.

The input IF 214 is a user interface that receives information from a user. An input device such as a keyboard 221, a mouse 222, a card reader, and a touch panel is connected to the input IF 214.

The output IF 215 is a user interface that outputs various kinds of information (a display output, an audio output, a print output, communication, and the like). An output device such as a display device 231, an audio output device (a speaker), a printing device, and a communication device is connected to the output IF 215.

The communication IF 216 is a communication interface that communicates with another device via a communication medium such as the NW 201. The communication IF 216 is, for example, a network interface card (NIC), a wireless communication module, a universal serial interface (USB) module, or a serial communication module.

Here, functions (the input unit 111, the deciding unit 112, the determining unit 113, the output unit 114, the storage unit 115, and the like) of the communication requirement generation system 110 may be implemented by (software), for example, the processor 211 reading a program stored in the storage device 213 to the memory 212 and executing the program, may be implemented by hardware such as a dedicated circuit, or may be implemented by a combination of software and hardware. One function of the communication requirement generation system 110 may be divided into a plurality of functions, or a plurality of functions may be integrated into one function. A part of the functions of the communication requirement generation system 110 may be provided as another function or may be included in another function. A part of the functions of the communication requirement generation system 110 may be implemented by another computer capable of communicating with the communication requirement generation system 110. For example, the communication requirement generation system 110 may include the host 131.

FIG. 3 is a diagram illustrating an example of template information (a template table 300) related to an input of the APP information 116.

The template table 300 stores information for generating an input screen of the APP information 116 input via the user terminal 202. More specifically, the template table 300 stores a record in which information of an item number 301 (#), information of an outline 302, information of user input contents 303, and information of a security level application example 304 are associated with one another.

Identification information for identifying a record (information of the user input contents 303) is stored in the item number 301. Information indicating an outline of the user input contents 303 is stored in the outline 302. Information for inputting (for example, selectably inputting) information used for determining a security level of an APP is stored in the user input contents 303. Information indicating an example of a security level applied when the information of the user input contents 303 is selected is stored in the security level application example 304.

The configuration of the template table 300 is not limited to the above-described contents, and may not include some of the above-described data items or may include other data items. For example, the template table 300 may not include the outline 302 and the security level application example 304.

FIG. 4 is a diagram illustrating an example of the security level information 118 (a security level table 400).

The security level table 400 stores information on a security level. More specifically, the security level table 400 stores a record in which information of an item number 401 (#), information of a security level 402, information of an outline 403, information of a condition 404, information of an APP security cost 405, and information of a communication permission security cost 406 are associated with one another.

Identification information for identifying a record (information of the security level 402) is stored in the item number 401. Information indicating a security level ("high", "medium", "low", "1", "2", "3" . . . and the like) is stored in the security level 402. Information indicating an outline of a security level is stored in the outline 403. Information indicating a condition corresponding to a security level is stored in the condition 404. Information indicating a value of a security cost assigned to an APP is stored in the APP security cost 405. Information indicating a value (a threshold) of a security cost at which communication is permitted unconditionally is stored in the communication permission security cost 406.

The configuration of the security level table 400 is not limited to the above-described contents, and may not include some of the above-described data items or may include other data items. For example, the security level table 400 may not include the outline 403.

FIG. 5 is a diagram illustrating an example of the node information 119 (a node table 500) including information on a node.

The node table 500 stores information for implementing a tree structure in a relational database (RDB). Although an adjacency list model is illustrated as a data model for expressing a tree structure in the RDB in the present embodiment, a route list model, a closure table model, a nested set model, or the like may be used. More specifically, the node table 500 stores a record in which information of an item number 501 (#), information of a node 502, information of a parent node 503, and information of a security cost 504 are associated with one another.

Identification information for identifying a record (information of the node 502) is stored in the item number 501. Information indicating a node is stored in the node 502. Information indicating a parent node of a node in the node 502 is stored in the parent node 503. Information indicating a value of a security cost assigned to a node stored in the node 502 is stored in the security cost 504.

FIG. 6 is a diagram illustrating an example of a tree structure (a tree structure 600).

The tree structure 600 is information indicating a structure of a predetermined NW, is represented by nodes (nodes, vertices) and edges (branches, sides) connecting the nodes, and has only one root. More specifically, the tree structure 600 includes a root node 601, branch nodes 602, and leaf nodes 603. The root node 601 is a node that is located at the top and does not have a parent node, and is a root of an NW structure such as the Internet. Each of the branch nodes 602 is a node having one or more child nodes, and is a logical group (a group that is wide as going to the top) in which APPs are integrated, such as a department or a system in a company. Each of the leaf nodes 603 is a node that is located at the bottom and does not have a child node, and is an APP, a server device, a user terminal, or the like. In the present embodiment, a security cost is set for each node, and the number in parentheses of each node shown in FIG. 6 indicates the security cost.

FIGS. 7 and 8 are diagrams illustrating an example of communication requirement generation processing.

In step S701, the input unit 111 inputs the APP information 116 of an APP connected to a predetermined NW via an input device, the user terminal 202, or the like.

In step S702, the input unit 111 inputs the APP image 117 of the APP connected to the predetermined NW via an input device, the user terminal 202, or the like.

For example, the APP developer inputs the APP information 116 and the APP image 117 via an input screen displayed on the user terminal 202. The input unit 111 receives the APP information 116 and the APP image 117 from the user terminal 202, and stores the received APP information 116 and APP image 117. The input screen for inputting the APP information 116 and the APP image 117 will be described in detail with reference to FIG. 9.

In step S703, the input unit 111 inputs the communication requirement 150 of an APP via an input device, the communication requirement reception unit 120, the user terminal 202, and the like. For example, the APP developer inputs the communication requirement 150 via an input screen displayed on the user terminal 202, and the input unit 111 receives the communication requirement 150 from the user terminal 202. The input screen for inputting the communication requirement 150 will be described in detail with reference to FIG. 10.

In step S704, the input unit 111 determines whether a security level (for example, a value of the security level 402 in the security level table 400) is defined. When the input unit 111 determines that a security level is not defined, the processing proceeds to step S705, and when the input unit 111 determines that a security level is defined, the processing proceeds to step S706.

In step S705, the input unit 111 inputs the security level via an input device, the user terminal 202, or the like. For example, the NW operator inputs a value of the security level 402 in the security level table 400 via the user terminal 202, and the input unit 111 stores the input value in the security level 402 in the security level table 400.

In step S706, the input unit 111 determines whether a security level determination condition (for example, a value of the condition 404 in the security level table 400) which is a condition used for determining a security level is defined. When the input unit 111 determines that the security level determination condition is not defined, the processing proceeds to step S707, and when the input unit 111 determines that the security level determination condition is defined, the processing proceeds to step S708.

In step S707, the input unit 111 inputs the security level determination condition. For example, the NW operator inputs a value (a condition, a function, or the like) of the condition 404 in the security level table 400 via the user terminal 202, and the input unit 111 stores the input value in the condition 404 in the security level table 400.

In step S708, the input unit 111 determines whether a security cost (for example, values of the APP security cost 405 and the communication permission security cost 406 in the security level table 400) corresponding to the security level is defined. When the input unit 111 determines that a security cost corresponding to the security level is not defined, the processing proceeds to step S709, and when the input unit 111 determines that a security cost corresponding to the security level is defined, the processing proceeds to step S710.

In step S709, the input unit 111 inputs the security cost corresponding to the security level. For example, the NW operator inputs values of the APP security cost 405 and the communication permission security cost 406 in the security level table 400 via the user terminal 202, and the input unit 111 stores the input values in the APP security cost 405 and the communication permission security cost 406 in the security level table 400.

In step S710, the deciding unit 112 decides (determines) a security level of an APP based on the APP information 116 and the security level table 400.

For example, the deciding unit 112 reads the APP information 116 of the APP connected to the predetermined NW, specifies a record of the security level table 400 in which the read APP information 116 satisfies the condition 404 in the security level table 400, reads a value of the security level 402 in the specified record, and decides the read value as a security level of the APP.

In step S711, the input unit 111 determines whether a tree structure (for example, values of the node 502 and the parent node 503 in the node table 500) is defined. When the input unit 111 determines that a tree structure is not defined, the processing proceeds to step S712, and when the input unit 111 determines that a tree structure is defined, the processing proceeds to step S713.

In step S712, the input unit 111 inputs the tree structure via an input device, the user terminal 202, or the like. For example, the NW operator inputs values of the node 502 and the parent node 503 in the node table 500 for each node of the tree structure via the user terminal 202. The input unit 111 stores the input values in the node 502 and the parent node 503 of the node table 500.

In step S713, the input unit 111 inputs, via an input device, the user terminal 202, or the like, a position of the APP connected to the predetermined NW as a node in the tree structure in order to define the APP in the tree structure. For example, the NW operator inputs, via the user terminal 202, values of the node 502 and the parent node 503 in the node table 500 so as to indicate a node of the APP in the tree structure 600. The input unit 111 stores (adds) a record in which the input values are set in the node 502 and the parent node 503 in the node table 500. At this time, based on the security level of the APP decided in step S710, the input unit 111 may specify a record of the security level table 400 corresponding to the security level, read a value of the APP security cost 405 of the specified record, and store the read value in the security cost 504 of the added record.

In step S714, the input unit 111 determines whether a security cost (for example, a value of the security cost 504 in the node table 500) of each node is defined. When the input unit 111 determines that a security cost of each node is not defined, the processing proceeds to step S715, and when the input unit 111 determines that a security cost of each node is defined, the processing proceeds to step S801.

In step S715, the input unit 111 inputs the security cost of each node via an input device, the user terminal 202, or the like. For example, the NW operator inputs the values in the security cost 504 in the node table 500 for the root node 601 and the branch nodes 602 via the user terminal 202. The input unit 111 stores the input values in the security cost 504 of the record of the node table 500. The input unit 111 determines the values in the security cost 504 in the node table 500 for the leaf nodes 603 based on security levels of the leaf nodes 603, and stores the determined values in the security cost 504 in the node table 500. For example, based on the security levels of the APP (the leaf nodes 603) determined in step S710, the input unit 111 specifies a record of the security level table 400 corresponding to the security levels, and executes, for each of the leaf nodes 603, processing of determining a value of the APP security cost 405 in the specified record as a security level of the leaf node 603.

In step S801, the determining unit 113 repeats steps S802 to S804 until security costs of all communication requirements 150 are calculated.

In step S802, the determining unit 113 extracts one of the communication requirements 150 input by a user.

In step S803, the determining unit 113 refers to the node table 500, calculates a security cost of the extracted communication requirement (a security cost between a transmission source APP and a destination APP), and stores the calculated security cost in association with the extracted communication requirement.

For example, the determining unit 113 specifies a shortest route between APPs according to a predetermined algorithm (for example, a width-first search and a bidirectional search) based on the tree structure 600. Subsequently, the determining unit 113 calculates a sum of security costs of nodes included in the route, and stores the calculated value as a security cost of the communication requirement. More specifically, when a transmission source of the extracted communication requirement is an "application C" and a destination is "DNS", the determining unit 113 specifies a route "application C→Z system→Y department→X company-→DNS". Then, the determining unit 113 calculates a sum "10 (=1+1+2+5+1)" of security costs of the nodes, and registers the calculated value in a security cost list. The security cost list will be described in detail with reference to FIG. 11.

In step S804, the determining unit 113 determines whether there is a communication requirement of which a security cost is not calculated. When the determining unit 113 determines that there is such a communication requirement, the processing proceeds to step S802, and when the determining unit 113 determines that there is no such a communication requirement, the processing proceeds to step S805.

In step S805, the determining unit 113 specifies a value "N" of a security cost at which communication is permitted unconditionally corresponding to the security level of the APP connected to the predetermined NW. For example, based on the security level of the APP determined in step S710, the determining unit 113 specifies a record of the security level table 400 corresponding to the security level, reads a value of the communication permission security cost 406 in the specified record, and sets the read value to "N".

In step S806, the determining unit 113 repeats steps S807 to S811 until it is determined whether all communication requirements 150 are output.

In step S807, the determining unit 113 extracts one of the communication requirements 150 input by a user.

In step S808, the determining unit 113 refers to a value "M" of a security cost of the extracted communication requirement (the value registered in the security cost list in step S803).

In step S809, the determining unit 113 determines whether "M">"N" is satisfied (whether it is a communication requirement that requires confirmation of the NW operator). When the determining unit 113 determines that "M">"N" is satisfied, the processing proceeds to step S810, and when the determining unit 113 determines that "M">"N" is not satisfied, the processing proceeds to step S811.

In step S810, the determining unit 113 registers the communication requirement extracted in step S807 in a communication requirement list. The communication requirement list will be described in detail with reference to FIG. 11.

In step S811, the determining unit 113 determines whether there is a communication requirement for which it is not determined whether the communication requirement is output. When the determining unit 113 determines that there is such a communication requirement, the processing proceeds to step S807, and when the determining unit 113 determines that there is no such a communication requirement, the processing proceeds to step S812.

In step S812, the determining unit 113 outputs the communication requirement list to the user terminal 202 of the NW operator.

In step S813, the input unit 111 inputs permission or rejection for a communication requirement via an input device, the user terminal 202, or the like. For example, the NW operator confirms the communication requirement list, inputs a value of permission or rejection for each communication requirement via the user terminal 202, and the input unit 111 stores the input value in association with the communication requirement. A confirmation screen for confirming each communication requirement in the communication requirement list will be described in detail with reference to FIG. 12.

FIG. 9 is a diagram illustrating an example of an input screen (an input screen 900) for inputting the APP information 116 and the APP image 117.

The input screen 900 is provided with an input field 910 for inputting the APP information 116 and an input field 920 for inputting the APP image 117. The input field 910 is provided such that the APP developer can select contents stored in the user input contents 303 in the template table 300. The APP image 117 is provided such that the APP developer can upload the APP image 117.

The APP developer inputs the APP information 116 and the APP image 117 via the input screen 900.

FIG. 10 is a diagram illustrating an example of an input screen (an input screen 1000) for inputting the communication requirement 150.

The input screen 1000 is provided with an input field 1010 for manually inputting the communication requirement 121 and an input field 1020 for inputting the communication requirement 122 generated by a predetermined system.

Information of an item number 1011 (#), a transmission source 1012, a destination 1013, and a service 1014 is input in the input field 1010. Identification information for identifying a record (a communication requirement) is automatically input in the item number 1011. Information (a name, an IP address, and the like) indicating a transmission source of communication is input in the transmission source 1012. Information (a name, an IP address, and the like) indicating a transmission destination (a destination) of communication is input in the destination 1013. Information for identifying a service (for example, an L4 protocol and a port number) used in communication is input in the service 1014.

The APP developer inputs the communication requirement 150 via the input screen 1000.

FIG. 11 is a diagram illustrating an example of a security cost list (a security cost table 1110) and an example of a communication requirement list (a communication requirement table 1120).

The security cost table 1110 is a table in which a security cost is assigned to the communication requirement 150. The communication requirement table 1120 is a table that stores a communication requirement having a security cost higher than a threshold provided corresponding to a security level of an APP (a communication requirement having a high security risk, in other words, a communication requirement that requires confirmation of the NW operator).

For example, in a case where a security cost of each communication requirement is calculated and stored as illustrated in the security cost table 1110, when the threshold provided corresponding to a security level of an APP is "10", a communication requirement whose security cost is larger than "10" is selected as illustrated in the communication requirement table 1120.

FIG. 12 is a diagram illustrating an example of a confirmation screen (a confirmation screen 1200) for the NW operator to confirm a communication requirement output from the communication requirement generation system 110.

The confirmation screen 1200 is provided with a display field 1210 for displaying the communication requirement generated by the communication requirement generation system 110, and an input field 1220 for inputting a result of confirming the communication requirement by the NW operator. For example, the input field 1220 stores "permit" indicating permission for communication of the communication requirement and "reject" indicating rejection for the communication of the communication requirement.

The communication requirement confirmed by the NW operator on the confirmation screen 1200 is passed to the FW setting system 132 by the NW operator (manually) or without through the NW operator (automatically).

FIG. 13 is a diagram illustrating an example of the FW setting information (an FW setting table 1300) set in the host 131 by the FW setting system 132.

The FW setting table 1300 stores information (a rule) set in an FW. More specifically, the FW setting table 1300 stores a record in which information of an item number 1301 (#), information of a transmission source 1302, information of a destination 1303, information of a service 1304, and information of an action 1305 are associated with one another.

The item number 1301 stores identification information for identifying a record (a rule). Information (a name, an IP address, and the like) indicating a transmission source of communication is stored in the transmission source 1302. Information (a name, an IP address, and the like) indicating a transmission destination (a destination) of communication is stored in the destination 1303. Information for identifying a service used in communication (for example, an L4 protocol and a port number) is stored in the service 1304. Information indicating whether to permit or reject communication when the information of the transmission source 1302, the information of the destination 1303, and the information of the service 1304 match with one another is stored in the action 1305. In the present embodiment, "permit" is set for communication of a communication requirement having a security cost equal to or lower than a threshold provided corresponding to a security level of an APP, and a result ("permit" or "reject") of the final determination made by the NW operator is set for communication of a communication requirement having a security cost higher than the threshold.

In the FW setting table 1300, a rule for rejecting all communication is set in a last record (a rule), thereby implementing a whitelist FW.

FIG. 14 is a diagram illustrating an example of communication management.

In the communication management system 100, an entire virtual NW 1400 is implemented by the host 131. As illustrated in the entire virtual NW 1400, an APP 1420 (a component) operates in a predetermined machine 1410. The predetermined machine 1410 is connected to a predetermined NW 1430. The machine 1410 is a physical computer or a virtual computer, and is a physical server, a virtual machine, a container, a mobile terminal, or the like. The NW 1430 is an example of a predetermined NW, and may be the same as or different from the NW 201.

The host 131 sets a distributed FW 1440 for each APP 1420 to be added to or changed in the NW 1430, and manages communication among the APPs 1420. Hereinafter, a method of managing communication will be described by exemplifying a case where a transmission source APP 1420A transmits data to a transmission destination APP 1420B. In this case, the FW setting table 1300 used by a host 131A that provides the distributed FW 1440 of the transmission source APP 1420A and the FW setting table 1300 used by a host 131B that provides the distributed FW 1440 of the transmission destination APP 1420B are provided. A rule of the distributed FW 1440 is input to the FW setting table 1300 by the user terminal 202 or the FW setting system 132 according to an instruction from an NW operator 1450. In other words, contents updated to the FW setting table 1300 of one host 131 are applied to the FW setting tables 1300 of all hosts 131.

Here, when the transmission source APP 1420A transmits data to the transmission destination APP 1420B, the transmission source APP 1420A passes a packet (divided data) to the host 131A. At this time, the packet is not controlled. The host 131A refers to the FW setting table 1300 of the host 131A to determine whether the packet may be transferred. When it is determined that the packet may be transferred, the host 131A executes packet transfer processing, and when the packet may not be transferred, the host 131A blocks the packet. In the packet transfer processing, the host 131A transfers the packet based on a routing table.

The transferred packet arrives at the host 131B via the NW 1430 (an L3 switch, an L2 switch, and the like). The host 131B refers to the FW setting table 1300 of the host 131B and determines whether to pass the packet to the transmission destination APP 1420B. When it is determined that the packet may be transferred, the host 131B passes the packet to the transmission destination APP 1420B, and when it is determined that the packet may not be transferred, the host 131B blocks the packet. Since the host 131B determines the same contents as that of the host 131A, the packets are basically not blocked when passing through the host 131B.

According to the present embodiment, it is possible to provide a highly convenient communication requirement generation system.

(II) Second Embodiment

In the first embodiment, the FW setting information (a rule) is registered for all input communication requirements. A main difference between the present embodiment and the first embodiment is that the FW setting information is registered for a communication requirement having a high security risk. In the present embodiment, a configuration different from that in the first embodiment will be mainly described, and description of the same configuration as that in the first embodiment will be omitted.

FIG. 15 is a diagram illustrating an example of packet control processing. The packet control processing is executed when the host 131 receives a packet. Hereinafter, a case where the host 131A receives a packet from the transmission source APP 1420A will be described as an example.

In step S1501, the host 131A confirms a transmission source and a destination of the packet transmitted from the transmission source APP 1420A to the transmission destination APP 1420B. For example, the host 131A confirms an IP address of the transmission source APP 1420A and an IP address of the transmission destination APP 1420B of the packet.

In step S1502, the host 131A calculates a security cost "M" between the transmission source and the destination. This processing is the same as the processing in step S803, and description thereof is omitted.

In step S1503, the host 131A determines whether "M">"N" is satisfied. When the host 131A determines that "M">"N" is satisfied, the host 131A determines whether the packet may be transferred with reference to the FW setting table 1300 of the host 131A. When the host 131A determines that the packet may be transferred, the host 131A executes the packet transfer processing, and when the host 131A determines that the packet may not be transferred, the host 131A blocks the packet. On the other hand, when the host 131A determines that "M">"N" is not satisfied, the host 131A executes the packet transfer processing.

A security cost is calculated for each communication, and the FW setting information is referred to when the calculated security cost is larger than the threshold in the present embodiment, so that it is not necessary to register FW setting information of a security cost smaller than the threshold, and it is possible to avoid a situation in which the FW setting information becomes enormous.

(III) Third Embodiment

An NW operator registers all pieces of information of the tree structure in the first embodiment. A main difference between the present embodiment and the first embodiment is that a part of the information of the tree structure is automatically registered. In the present embodiment, a configuration different from that in the first embodiment will be mainly described, and description of the same configuration as that in the first embodiment will be omitted.

FIG. 16 is a diagram illustrating an example of tree structure generation processing. The tree structure generation processing is executed instead of the step S712.

In step S1601, the input unit 111 reads directory service information. The directory service information is, for example, data of a tool (active directory or the like) that manages a resource such as a user and a PC in a company.

In step S1602, the input unit 111 generates a tree structure (a table and a diagram) based on the directory service information read in step S1601.

In step S1603, the input unit 111 outputs the tree structure generated in step S1602 to the user terminal 202.

In step S1604, the input unit 111 corrects the tree structure in response to an instruction from the user terminal 202, and stores the corrected tree structure.

In the present embodiment, a load on an NW operator who defines a tree structure can be reduced by reading the directory service information and generating data of the tree structure used in the present system.

(IV) Appendix

The above-described embodiments include, for example, the following contents.

Although a case where the present invention is applied to a communication requirement generation system has been described in the embodiments described above, the present invention is not limited thereto, and can be widely applied to various systems, devices, methods, and programs.

In the embodiments described above, a part or all of programs may be installed from a program source in a device such as a computer that implements the communication requirement generation system. The program source may be, for example, a program distribution server or a computer-readable recording medium (for example, a non-transitory recording medium) connected via a network. In the above description, two or more programs may be implemented as one program, or one program may be implemented as two or more programs.

In the embodiments described above, a configuration of each table is an example, and one table may be divided into two or more tables, or all or some of two or more tables may be one table.

Although information on the communication requirement generation system is described using a table for the convenience of description in the embodiments described above, a data structure is not limited to a table. The information on the communication requirement generation system may be expressed by a data structure other than a table, such as extensible markup language (XML), YAML (YAML Ain't a Markup Language), a hash table, or a tree structure.

In the embodiments described above, the illustrated and described screens are merely examples, and any design may be used as long as received information is the same.

In the embodiments described above, the illustrated and described screens are merely examples, and any design may be used as long as the information to be presented is the same.

In the embodiments described above, an output of information is not limited to being displayed on a display. The output of information may be an audio output performed by a speaker, an output to a file, printing on a paper medium or the like performed by a printing device, projection on a screen or the like performed by a projector, or outputs of other forms.

In the above description, information such as a program, a table, and a file for implementing each function may be stored in a storage device such as a memory, a hard disk, and a solid state drive (SSD), or a recording medium such as an IC card, an SD card, and a DVD.

The embodiments described above have, for example, the following characteristic configurations.

(1) A communication requirement generation system (for example, the communication requirement generation system 110) includes: a storage unit (the storage unit 115, a function of the communication requirement generation system 110, a server device, a cloud system, and the like) configured to store definition information (for example, the node information 119) for calculating a logical distance (the number of nodes related to communication, routes related to communication, and the like) between components (components, APPs, functions of an APP, predetermined terminals, the APPs 1420, and the like) that perform communication in a predetermined network (the NW 1430, and the like); a determining unit (the determining unit 113, a function of the communication requirement generation system 110, a server device, a cloud system, and the like) configured to calculate, for each of a plurality of communication requirements related to the component connected to the network, a logical distance between the component and a component which is a communication partner of the component based on the definition information stored in the storage unit, and determine, based on the calculated distance (for example, whether the number of nodes related to communication exceeds a predetermined value, whether a predetermined node such as the Internet is included in a route related to communication, and the like), whether each of the communication requirements is a communication requirement that requires confirmation of an operator of the network; and an output unit (the output unit 114, a function of the communication requirement generation system 110, a server device, a cloud system, and the like) configured to output the communication requirement determined by the determining unit when the communication requirement is the communication requirement that requires confirmation of the operator of the network.

In the above configuration, it is determined whether each of the communication requirements is the communication requirement that requires confirmation of the operator of the network according to a logical positional relationship between the component connected to the network and the component of the communication partner. According to the above configuration, it is possible to reduce a load of the operator of the network for setting a communication requirement to a firewall by, for example, focusing on communication requirements that require confirmation of the operator of the network from the plurality of communication requirements related to the component connected to the network.

(2) The communication requirement generation system further includes: a deciding unit (the deciding unit 112, a function of the communication requirement generation system 110, a server device, a cloud system, and the like) configured to decide a security level indicating security strength of the component that performs communication in the network; and an input unit (the input unit 111, a function of the communication requirement generation system 110, a server device, a cloud system, and the like) configured to input information (for example, at least one of the APP information 116 and information indicating an APP behavior) used for determining a security level of the component connected to the network as information of the component, in which the storage unit stores security level condition information (for example, a value of the condition 404) indicating a condition for determining the security level of the component that performs communication in the network, the deciding unit decides the security level of the component based on the information of the component connected to the network input from the input unit and the security level condition information stored in the storage unit (for example, see step S710), and the determining unit determines whether each of the plurality of communication requirements related to the component is the communication requirement that requires confirmation of the operator of the network based on the security level of the component (for example, see step S806 to step S811).

According to the above configuration, for example, since a communication requirement that requires confirmation of the operator of the network is determined based on the security level that is determined as a security level satisfying a security policy of a company, it is possible to avoid a situation in which setting of a firewall is not suitable for the security policy of the company.

(3) The storage unit stores, for each security level, first security cost information (for example, a value of the APP security cost 405) indicating a security cost set for the component connected to the network and threshold information (for example, a value of the communication permission security cost 406) indicating a threshold for determining whether to permit communication of the component. The storage unit stores node information (for example, values of the node 502 and the parent node 503) indicating nodes which are constituent elements when a logical structure related to communication via the network is expressed by a tree structure, and second security cost information (for example, a value of the security cost 504) indicating security costs set to the nodes in the tree structure. The determining unit reads, from the storage unit, the first security cost information and the threshold information corresponding to the security level of the component connected to the network, which is decided by the deciding unit, and for each of the plurality of communication requirements related to the component, the determining unit specifies a node related to communication between the component and the component which is the communication partner of the component based on the node information stored in the storage unit, calculates a security cost of a communication requirement by adding security costs of the specified nodes based on the first security cost information and the second security cost information stored in the storage unit, and determines that a communication requirement of which the calculated security cost exceeds a threshold of the threshold information is the communication requirement that requires confirmation of the operator of the network (for example, see FIG. 8).

In the above configuration, the communication requirement that requires confirmation of the operator of the network is determined in consideration of the security cost and the threshold corresponding to the security level of the component connected to the network and the security costs of nodes related to communication of the component in the tree structure. According to the above configuration, for example, it is possible to set a firewall corresponding to a security level of the component connected to the network.

(4) The communication requirement generation system includes a host (for example, the host 131) configured to control communication between the components in the network, in which a communication requirement of the component connected to the network for which the operator of the network confirms whether to permit communication is set in setting information (for example, the FW setting table 1300) of a firewall of the component, and the host controls communication between the component and the component of the communication partner based on the setting information when the host receives a packet from the component.

According to the above configuration, since the packet is transferred based on the setting information of the firewall of the component, for example, it is possible to obtain a firewall for each component according to a security policy of a company.

(5) When the host receives the packet from the component, the host specifies the component of the communication partner for the component which is a destination of the packet, specifies nodes related to communication between the component and the component of the communication partner based on the node information stored in the storage unit, calculates a communication security cost by adding security costs of the specified nodes based on the first security cost information corresponding to the security level of the component and the second security cost information stored in the storage unit, and transfers the packet to the communication partner of the component or block the packet based on the setting information when the calculated communication security cost exceeds the threshold of the threshold information corresponding to the security level of the component (for example, see FIG. 15).

In the above configuration, since the setting information is referred to when the security cost of the communication is larger than the threshold, for example, it is not necessary to set a rule in which the security cost is smaller than the threshold in the setting information, and it is possible to avoid a situation in which the number of rules of the setting information becomes enormous.

(6) When the node information is not stored in the storage unit, the determining unit reads directory service information, outputs the read information to a user terminal, receives information corrected in the user terminal as the node information, and the storage unit stores the node information received by the determining unit (for example, see FIG. 16).

In the above configuration, for example, since the node information is generated from the directory service information, a load of inputting the node information can be reduced.

(7) The output unit outputs a screen (for example, the input screen 900) for selectably inputting at least one of a business type of a business in which the component connected to the network is used, a type of the component, a type of data handled by the component, and presence or absence of communication performed by the component via the Internet, as information of the component.

In the above configuration, for example, since a screen for selecting and inputting the information of the component is output, the operator of the network can easily input the information of the component.

(8) The output unit outputs a screen (for example, the confirmation screen 1200) for inputting whether to permit communication of the communication requirement determined by the determining unit.

In the above configuration, since the screen for inputting whether to permit the communication of the communication requirement is output, for example, the operator of the network can easily set permission and rejection for the communication of the communication requirement.

Configurations described above may be appropriately changed, rearranged, combined, or omitted within a range not exceeding the gist of the present invention.

It should be understood that items included in a list in a form of "at least one of A, B, and C" may refer to (A), (B), (C), (A and B), (A and C), (B and C), or (A, B, and C). Similarly, items included in a list in a form of "at least one of A, B, or C" may refer to (A), (B), (C), (A and B), (A and C), (B and C), or (A, B, and C).

REFERENCE SIGNS LIST

110: communication requirement generation system
111: input unit
112: deciding unit
113: determining unit
114: output unit
115: storage unit

The invention claimed is:

1. A communication requirement generation system comprising:
   a storage unit configured to store definition information for calculating a logical distance between a first component that is connected to a network and a second component which is a communication partner of the first component;
   a determining unit configured to calculate, for each of a plurality of communication requirements related to the first component, the logical distance between the first component and the second component based on the definition information stored in the storage unit, and determine, based on the logical distance, whether each of the communication requirements is a communication requirement that requires confirmation of an operator of the network;
   a deciding unit configured to decide a security level indicating security strength of the first component;
   an input unit configured to input information used for determining the security level of the first component as information of the first component; wherein
   the storage unit stores security level condition information indicating a condition for determining the security level of the first component,
   the deciding unit decides the security level of the first component based on the information of the first component input from the input unit and the security level condition information stored in the storage unit, and
   the determining unit determines whether each of the plurality of communication requirements related to the first component is the communication requirement that requires confirmation of the operator of the network based on the security level of the first component; and
   an output unit configured to output the communication requirement determined by the determining unit when the communication requirement is the communication requirement that requires confirmation of the operator of the network.

2. The communication requirement generation system according to claim 1, wherein
   the storage unit stores, for each security level, first security cost information indicating a security cost set for the first component and threshold information indicating a threshold for determining whether to permit communication of the first component,
   the storage unit stores node information indicating nodes which are constituent elements when a logical structure related to communication via the network is expressed by a tree structure, and second security cost information indicating security costs set to the nodes in the tree structure,
   the determining unit reads, from the storage unit, the first security cost information and the threshold information corresponding to the security level of the first component, which is decided by the deciding unit, and for each of the plurality of communication requirements related to the first component, the determining unit
   specifies nodes related to communication between the first component and the second component based on the node information stored in the storage unit,
   calculates a security cost of a communication requirement by adding security costs of the specified nodes based on the first security cost information and the second security cost information stored in the storage unit, and
   determines that a communication requirement of which the calculated security cost exceeds a threshold of the threshold information is the communication requirement that requires confirmation of the operator of the network.

3. The communication requirement generation system according to claim 2, further comprising:
   a host configured to control communication between the first component and the second component, wherein
   a communication requirement of the first component for which the operator of the network confirms whether to permit communication is set in setting information of a firewall of the first component, and
   the host controls communication between the first component and the second component of the communication partner based on the setting information when the host receives a packet from the first component.

4. The communication requirement generation system according to claim 3, wherein
   when the host receives a packet from the first component, the host
   specifies the second component which is a destination of the packet, specifies nodes related to communication between the first component and the second component based on the node information stored in the storage unit, calculates a communication security cost by adding the security costs of the specified nodes based on the first security cost information corresponding to the security level of the first component and the second security cost information stored in the storage unit, and transfers the packet to the second component or block the packet based on the setting information when the calculated communication security cost exceeds the threshold of the threshold information corresponding to the security level of the first component.

5. The communication requirement generation system according to claim 2, wherein when the node information is not stored in the storage unit, the determining unit reads directory service information, outputs the read information to a user terminal, and receives information corrected in the user terminal as the node information, and the storage unit stores the node information received by the determining unit.

6. The communication requirement generation system according to claim 1, wherein the output unit outputs a screen for selectably inputting at least one of a business type of a business in which the first component is used, a type of the first component, a type of data handled by the first component, and presence or absence of communication performed by the first component via the Internet, as information of the first component.

7. The communication requirement generation system according to claim 1, wherein the output unit outputs a screen for inputting whether to permit communication of the communication requirement determined by the determining unit.

8. A communication requirement generation method comprising:

storing, by a storage unit, definition information for calculating a logical distance between a first component that is connected to a network and a second component which is a communication partner of the first component;

calculating, by a determining unit, for each of a plurality of communication requirements related to the first component, a logical distance between the first component and the second component based on the definition information stored in the storage unit, and determining, based on the logical distance, whether each of the communication requirements is a communication requirement that requires confirmation of an operator of the network;

deciding, by a deciding unit, a security level indicating security strength of the first component;

inputting, by an input unit, information used for determining the security level of the first component as information of the first component; wherein the storage unit stores security level condition information indicating a condition for determining the security level of the first component, the deciding unit decides the security level of the first component based on the information of the first component input from the input unit and the security level condition information stored in the storage unit, and the determining unit determines whether each of the plurality of communication requirements related to the first component is the communication requirement that requires confirmation of the operator of the network based on the security level of the first component; and outputting, by an output unit, the communication requirement determined by the determining unit when the communication requirement is the communication requirement that requires confirmation of the operator of the network.

* * * * *